United States Patent
Park et al.

(10) Patent No.: US 7,929,853 B2
(45) Date of Patent: Apr. 19, 2011

(54) METHOD AND APPARATUS FOR TAKING PICTURES ON A MOBILE COMMUNICATION TERMINAL HAVING A CAMERA MODULE

(75) Inventors: Dong-Youl Park, Suwon-si (KR);
Young-Kwon Yoon, Seoul (KR);
Yeon-Jun Lee, Suwon-si (KR);
Jung-Tae Kwon, Osan-si (KR);
Man-Ho Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/553,550

(22) Filed: Sep. 3, 2009

(65) Prior Publication Data
US 2010/0056211 A1  Mar. 4, 2010

(30) Foreign Application Priority Data
Sep. 4, 2008 (KR) .......................... 10-2008-0087292

(51) Int. Cl.
*G03B 17/00* (2006.01)

(52) U.S. Cl. .......................................... 396/153; 396/52
(58) Field of Classification Search .................. 396/153, 396/52
See application file for complete search history.

(56) References Cited

U.S. PATENT DOCUMENTS

| 7,688,379 B2 * | 3/2010 | Forman et al. ................. 348/356 |
| 2007/0237514 A1 * | 10/2007 | Pillman et al. ................. 396/153 |

* cited by examiner

*Primary Examiner* — Rodney E Fuller
(74) *Attorney, Agent, or Firm* — The Farrell Law Firm, P.C.

(57) ABSTRACT

A method and an apparatus for taking pictures on a mobile communication terminal having a camera module are provided, which can control the photographing of an object in accordance with the motion of the object. The method includes generating a current frame by photographing an object, determining whether blurring has occurred in the current frame, measuring an amount of motion of the current frame if no blurring has occurred in the generated current frame, and storing the current frame if the measured amount of motion is greater than a pre-stored reference amount of motion.

12 Claims, 7 Drawing Sheets

METHOD AND APPARATUS FOR TAKING PICTURES ON A MOBILE COMMUNICATION TERMINAL HAVING A CAMERA MODULE

PRIORITY

This application claims the priority under 35 U.S.C. §119(a) to an application entitled "Method And Apparatus For Taking Pictures On Mobile Communication Terminal Having Camera Module" filed in the Korean Industrial Property Office on Sep. 4, 2008 and assigned Serial No. 10-2008-0087292, the contents of which are incorporated herein by reference.

BACKGROUND OF THE INVENTION

1. Field of the Invention

The present invention relates to a method and apparatus for taking pictures on a mobile communication terminal having a camera module, and more particularly to a method and apparatus for taking pictures on a mobile communication terminal having a camera module, which can control the photographing of an object in accordance with the motion of the object.

2. Description of the Related Art

In general, mobile communication terminals are designed to provide voice communication, but have gradually developed to provide more services to users. Recently, mobile communication terminals have started to provide data services such as short message services, photograph and motion video services, and mobile banking. Users of the mobile communication terminals with camera modules can take pictures of diverse images through their mobile communication terminals, and can continuously photograph an object at specified intervals as well.

FIG. 1 is a block diagram schematically illustrating a configuration of a conventional mobile communication terminal having a camera module.

The conventional mobile communication terminal 10 includes a phone module 12, a first memory 14, an Radio Frequency (RF) unit 16, an audio processing unit 18, a microphone 20, a speaker 22, a multimedia module 24, a second memory 26, a key input unit 28, and a display unit 30.

The phone module 12 is to control the telephone function, and the first memory 14 is composed of Read Only Memory (ROM), Random Access Memory (RAM), etc., to store data related to programs for multiple operations. The Radio Frequency (RF) unit 16 includes an RF transmitter performing frequency up-conversion of the transmitted signal and amplifying the up-converted signal, and an RF receiver low-noise-amplifying the received signal and performing frequency down-conversion of the amplified signal. The microphone 20 converts the user's voice into an electric signal, and the audio processing unit 18 performs Pulse Code Modulation (PCM) of the electric signal, or converts the pulse-code-modulated signal into an electric signal to output the converted electric signal to the speaker 22.

The multimedia module 24 performs gamma correction and color correction of a Joint Photographic coding Experts Group (JPEG) or YUV (YCbCr) signal output from the camera module 32 in the unit of a frame. The multimedia module 24 provides still image data or moving image data to the display unit 30. The second memory 26 stores photographed images (i.e., photograph data). The camera module 32 has a digital camera function and includes a lens unit 34, an image pickup device 36, a signal processing unit 38, a JPEG codec 40, and a third memory 42. The image pickup device is implemented by a Charge Coupled Device (CCD) or a Complementary Metal Oxide Semiconductor (CMOS).

The lens unit 34 receives light reflected from an object. The image pickup device 36 converts an optical signal input through the lens unit 34 into an electric signal. The signal processing unit 38 converts the signal output from the image pickup device 36 into a digital signal. The JPEG codec 40 is provided for image compression, and the third memory 42 temporarily stores data required for the image processing operation or stores photographed image data.

The key input unit 28 is provided with multiple keys for a user to input figures or characters, and the display unit 30 is implemented by a Liquid Crystal Display (LCD) to display various kinds of data.

FIG. 2 is a flowchart illustrating a method of taking pictures in a continuous photography mode in a conventional mobile communication terminal having a camera module.

The mobile communication terminal 10 determines whether a shutter key input is received from the user in a continuous photography mode, in step S42, and if the shutter key input is received ("Yes" in step S42), the mobile communication terminal 10 photographs an object using the camera module 32. If the shutter key input is not received ("No" in step S42), the mobile communication terminal is kept in a standby state. The mobile communication terminal 10 determines whether the number of pictures taken reaches a preset number of continuous pictures taken, in step S46, and continues taking pictures until the number of pictures taken reaches the preset number of continuous photography taken, in step S44.

However, in the continuous photography mode as described above, only the number of pictures taken or a continuous capture interval can be set, and thus photographs are taken regardless of the motion of the object. When the continuous capture interval is short, the motion of the object according to the continuous capture interval is not greatly changed, and thus the taken pictures are mostly the same. By contrast, when the continuous capture interval is long, the motion of the object is continuously captured through the lens unit 34 even during the capture time. Accordingly, the motion of the object is not clear, and thus the object appears blurred along the motion trace of the object. This phenomenon that the image appears blurred along the motion trace of the object is called "Blurring."

Accordingly, there is a need for a mobile communication terminal having a camera module that can photograph diverse shapes of an object by sensing the amount of motion of the object, identifying and storing an image having a relatively severe motion of the object in comparison to the previously taken picture.

SUMMARY OF THE INVENTION

Accordingly, the present invention has been made to solve the above-mentioned problems occurring in the prior art, and to provide a method and a apparatus for taking pictures on a mobile communication terminal having a camera module, which can capture the motion of an object and easily photograph different motions of the object.

In accordance with an aspect of the present invention, there is provided a method of taking pictures on a mobile communication terminal having a camera module, which includes generating a current frame by photographing an object; determining whether blurring has occurred in the current frame; if no blurring has occurred in the current frame, measuring the amount of motion of the current frame by comparing the current frame with a pre-stored previous frame, and determining whether the measured amount of motion is greater than a pre-stored reference amount; and if the measured amount of motion is greater than the reference amount, storing the current frame as a photograph file.

In accordance with another aspect of the present invention, there is provided an apparatus for taking pictures on a mobile communication terminal having a camera module, including a camera module generating a current frame by photographing an object; a control unit determining whether blurring has occurred in the current frame by comparing the current frame with a pre-stored previous frame, determining whether the amount of motion of the current frame is greater than a pre-stored reference amount of motion by comparing the amount of motion of the current frame with the amount of motion of the previous frame if no blurring has occurred in the current frame, and storing the current frame, in which no blurring has occurred and the amount of motion is greater than the reference change amount, as a photo file; and a memory for storing the determined current frame as the photo file.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EXEMPLARY EMBODIMENTS

Figure 1:
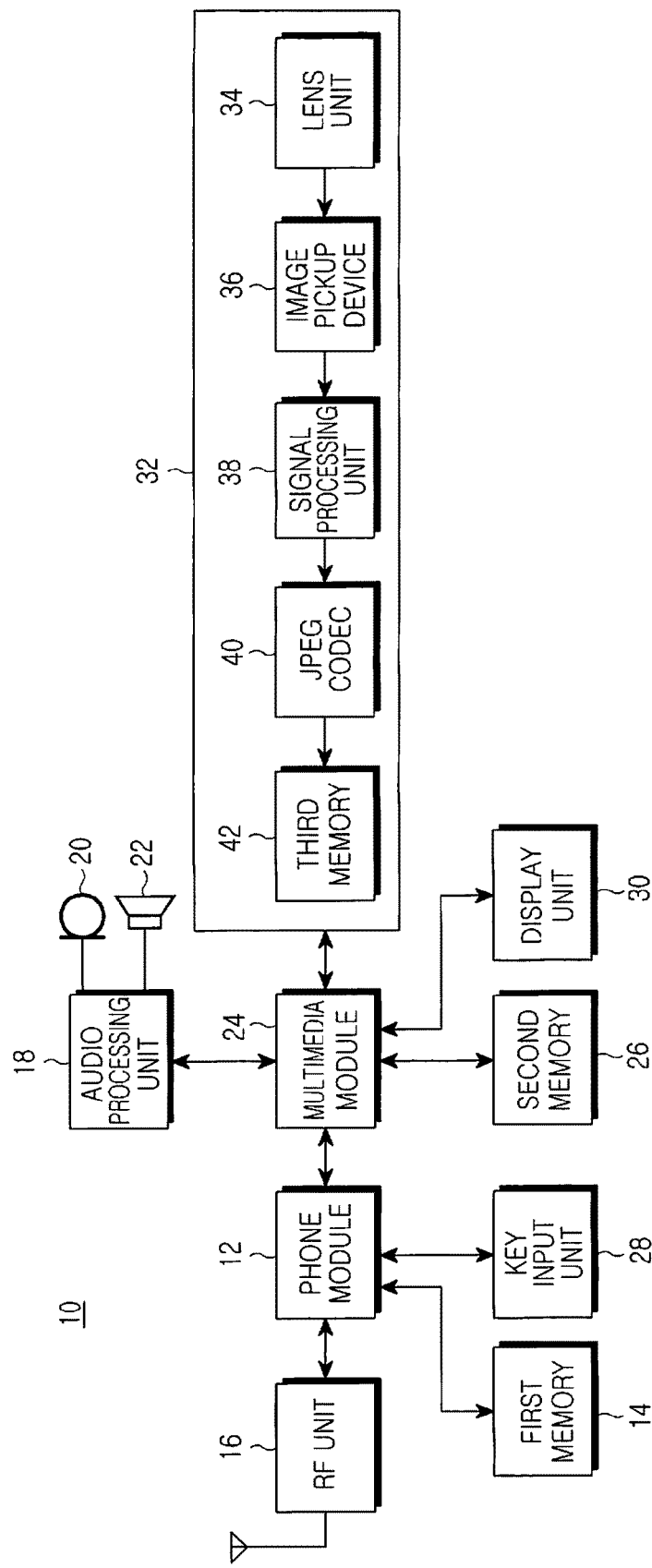
FIG. 1 is a block diagram schematically illustrating a configuration of a conventional mobile communication terminal having a camera module.
Figure 2:
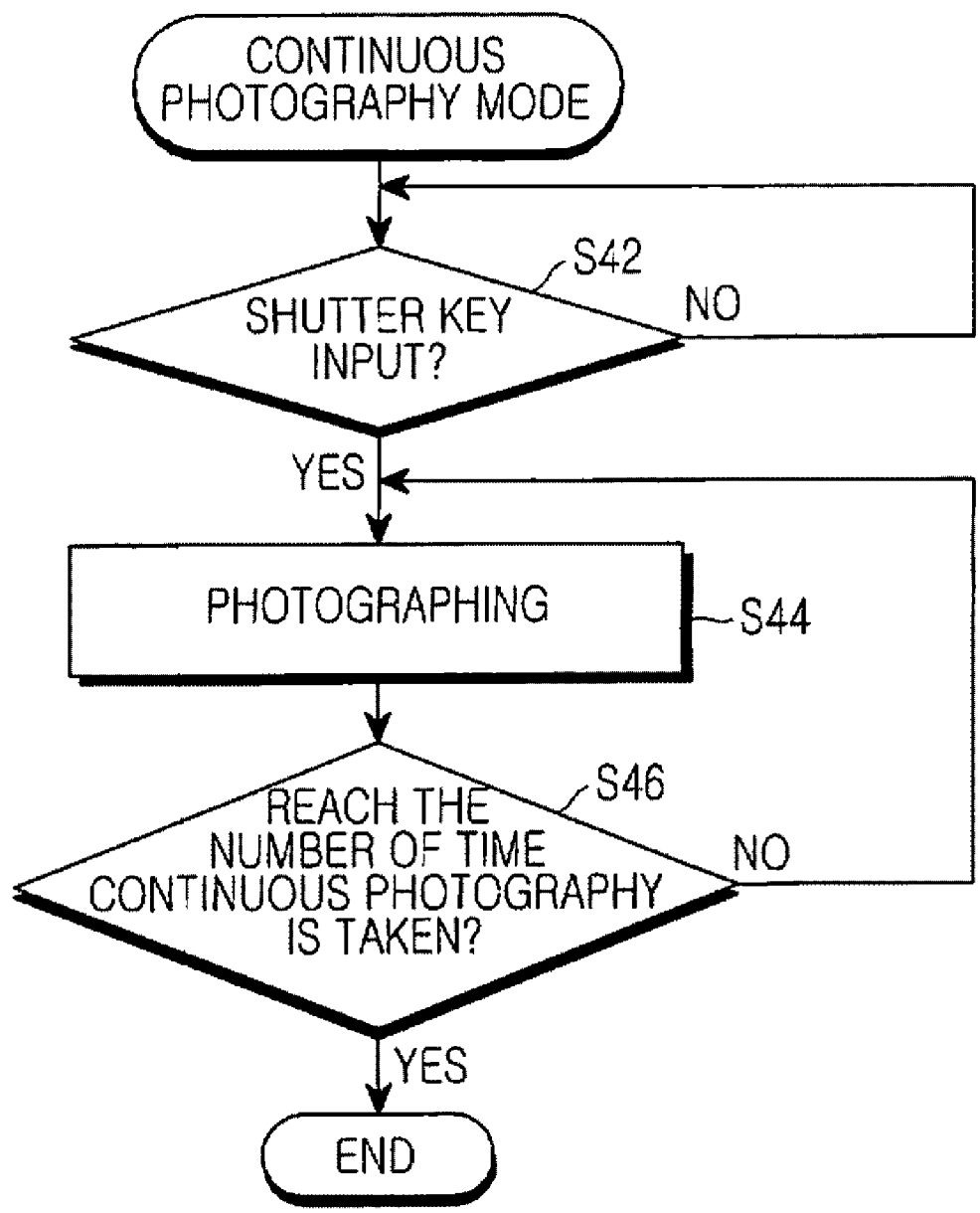
FIG. 2 is a flowchart illustrating a method of taking pictures in a continuous photography mode in a conventional mobile communication terminal having a camera module.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

Figure 3:
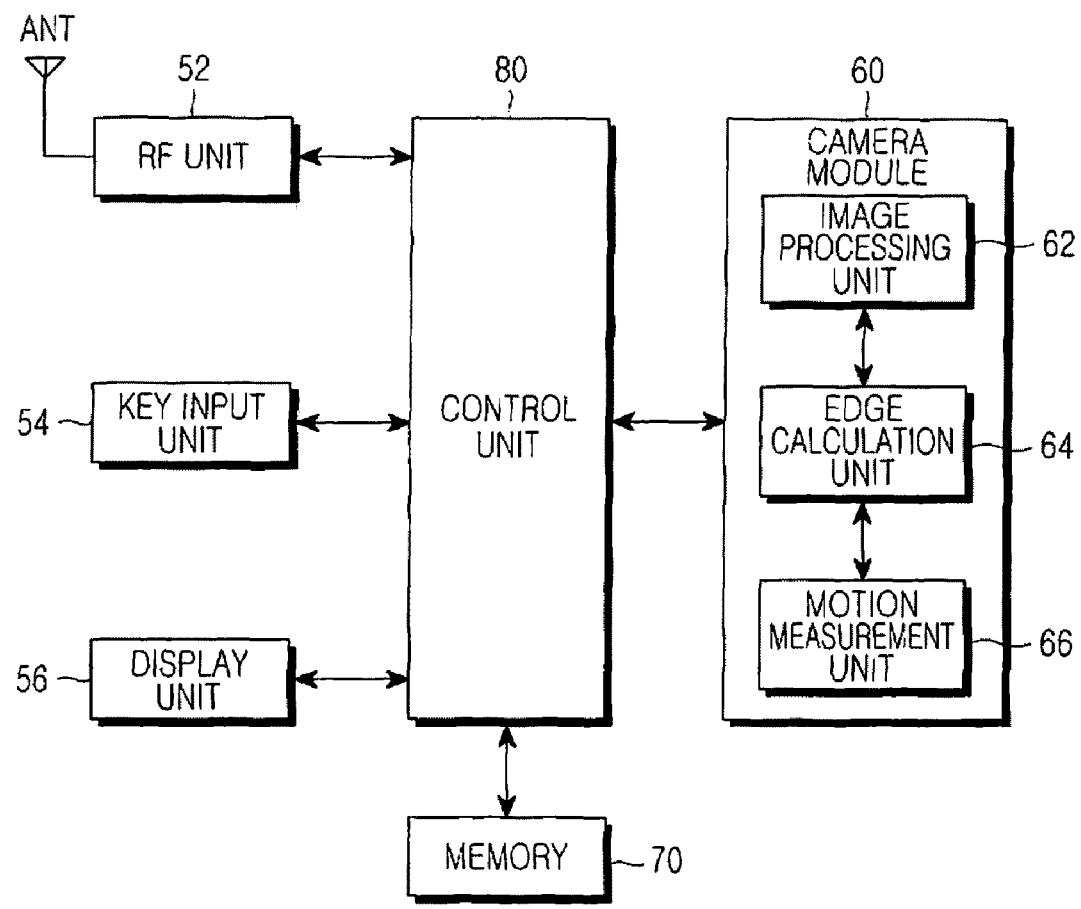
FIG. 3 is a block diagram schematically illustrating a configuration of a mobile communication terminal having a camera module according to an embodiment of the present invention.

FIG. 3 is a block diagram schematically illustrating the configuration of a mobile communication terminal having a camera module according to an embodiment of the present invention.

A mobile communication terminal 50 according to an embodiment of the present invention includes a camera module 60, a memory 70, and a control unit 80. Preferably, the mobile communication terminal 50 may further include an RF unit 52, a key input unit 54, and a display unit 56.

The RF unit 52 performs a wireless communication function of the mobile communication terminal 50. The RF unit 52 includes an RF transmitter (not illustrated) performing frequency up-conversion of the transmitted signal and amplifying the up-converted signal, and an RF receiver (not illustrated) low-noise-amplifying the received signal and performing frequency down-conversion of the amplified signal.

The key input unit 54 is provided with keys for inputting numerals and characters and keys for setting various kinds of functions. In the embodiment of the present invention, the key input unit 54 can receive user's input for operating a camera module 60 in a continuous photography mode. Also, when the camera module 60 operates in the continuous photography mode, the key input unit 54 can receive an input of a photography key from a user. Also, the key input unit 54 can receive the user input of the number of pictures to be taken in the continuous photography mode or the user input of a photographic interval.

If the number of pictures to be taken is "five" and the photographic interval is "one second," the camera module 60 photographs an object five times at an interval of one second. The photographic interval and the number of pictures taken may be pre-stored in the memory 70, and may be changed by the user's key input.

The display unit 56 may be composed of an LCD (Liquid Crystal Display) and so on, and outputs various kinds of display data generated in the mobile communication terminal 50. In the case of implementing a touch screen type LCD, the display unit 56 may also operate as an input means.

According to an exemplary embodiment of the present invention, the display unit 56 can display photo files photographed by the camera module 60. Also, the display unit 56 can display an image input through a lens (not illustrated) provided in the camera module 60.

The camera module 60 photographs an object and stores the photographed image as a photo file. The camera module 60 processes an image input through the lens and stores the processed image in the memory 70 as a photo file. Also, the camera module can continuously photograph an object up to the pre-stored number of pictures to be taken for a time period pre-stored in the memory 70 by setting a continuous photography mode under the control of the control unit 80, which is further described herein. The continuous photographing of an object up to the pre-stored number of pictures to be taken for a pre-stored time period as described above is called a "continuous photography mode."

According to an embodiment of the present invention, the camera module 60 includes an image processing unit 62, an edge calculation unit 64, and a motion measurement unit 66.

The image processing unit 62 generates a current frame by converting an image signal input through the lens (not illustrated) provided in the camera module 60 into a digital image signal under the control of the control unit 80. Also, the image processing unit 62 generates a sample image of the current frame when the camera module 60 operates in a continuous photography mode.

In this case, the "current frame" is a frame obtained by digital-processing the image signal photographed through a lens (not illustrated) at the present time. The "previous frame" to be described later is a frame generated at a time before the current frame is processed. In the embodiment of the present invention, the previous frame indicates a photo file in JPEG form pre-stored in the memory 70. Also, the previous frame in the continuous photography mode indicates a frame stored in the memory 70 as a photo file at a time before the current frame is generated.

The image processing unit 62 converts a frame into JPEG form and stores the converted frame in the memory 70 under the control of the control unit 80. In another embodiment of the present invention, the camera module 60 is provided with a separate JPEG codec in addition to the image processing unit 62, and converts the frame into a JPEG file.

The image processing unit 62 reduces the current frame to a size pre-stored in the memory 70, and generates a sample image by passing the reduced current frame through a high-pass filter (not illustrated). According to an embodiment of the present invention, the sample image is used to detect the motion change of an object photographed through the camera module 60. The detection of the motion change is described in further detail herein.

The edge calculation unit 64 calculates edge values using the sample image generated by the image processing unit 62. The "edge" indicates a part where an image presents a great color difference, such as a boundary between an object and a background. Also, in the embodiment of the present invention, the "edge value" is a value obtained by numeralizing and adding all edges appearing in the current frame or the previous frame. The edge value may be, for example, the number of pixels in a part of the corresponding sample image where edges appear.

The edge calculation unit 64 obtains an edge value by numeralizing edges appearing in a sample image of the current frame or the previous frame. For example, if the number of pixels in a part of the sample image of the current frame, in which edges appear, is 125, the edge value of the current frame becomes "125." As another example, the sample image may be divided into plural regions, and the edged value may be the number of regions in which edges are included. If it is assumed that the sample image is divided into 100 regions and 15 regions include edges, the edge value of the frame becomes "15."

In the embodiment of the present invention, the edge calculation unit 64 calculates the difference between a first edge value, that is the edge value of the sample image of the current frame, and a second edge value, that is the edge value of the sample image of the previous frame. Considering the case where the second edge value is greater than the first edged value, it is preferable that the edge calculation unit 64 processes the difference between the first edge value and the second edge value as the absolute value to output the difference value as a positive number.

Although not described in the embodiment of the present invention, the camera module 60 may further include a lens (not illustrated) receiving light reflected from an object, and an image pickup device (not illustrated) implemented by a CCD or a CMOS.

The memory 70 may be composed of a program memory and a data memory. In the memory 70, various kinds of information required to control the operation of the mobile communication terminal 50 are stored. In the embodiment of the present invention, the memory 70 stores the current frame, the previous frame, and sample images of the respective frames. Also, the memory 70 may store a reference amount of motion that is a value used to obtain the amount of motion of the object in the current frame, and a reference edge value that is a value used to determine whether blurring has occurred in the current frame. In the embodiment of the present invention, the memory 70 stores all programs for operating in the continuous photography mode and all the data used in the continuous photography mode.

Also, in the embodiment of the present invention, the mobile communication terminal 50 is provided with one memory 70. However, in another embodiment of the present invention, the mobile communication terminal 50 may be provided with plural memories 70. For example, the mobile communication terminal 50 may include a first memory (not illustrated) for communication functions such as voice calls and a second memory (not illustrated) for photographing function such as continuous photographing.

The control unit 80 controls the operation of the mobile communication terminal 50. According to an embodiment of the present invention, the control unit 80 determines whether blurring has occurred in a current frame. In performing the determination, the control unit 80 determines whether the difference between a first edge value and a second edge value, which is obtained by the edge calculation unit 64, is less than the reference edge value pre-stored in the memory 70. If the difference between the first edge value and the second edge value is less than the reference edge value, the control unit 80 determines that no blurring has occurred in the current frame. Otherwise, if the difference between the first edge value and the second edge value is greater than or equal to the reference edge value, the control unit 80 determines that blurring has occurred in the current frame.

Also, the control unit 80 determines whether the motion of the object in the current frame has been changed distinctly from the previous frame, by determining whether the amount of motion of the object in the current frame, which is measured by the motion measurement unit 66, is greater than a reference amount of motion. If the amount of motion of the object is greater than the reference amount of motion, the control unit 80 controls the image processing unit of the camera module 60 to store the current frame in the memory as a photo file. Otherwise, if the amount of motion of the object is less than or equal to the reference amount of motion, the control unit 80 controls the camera module 60 to re-photograph the object.

Figure 4:
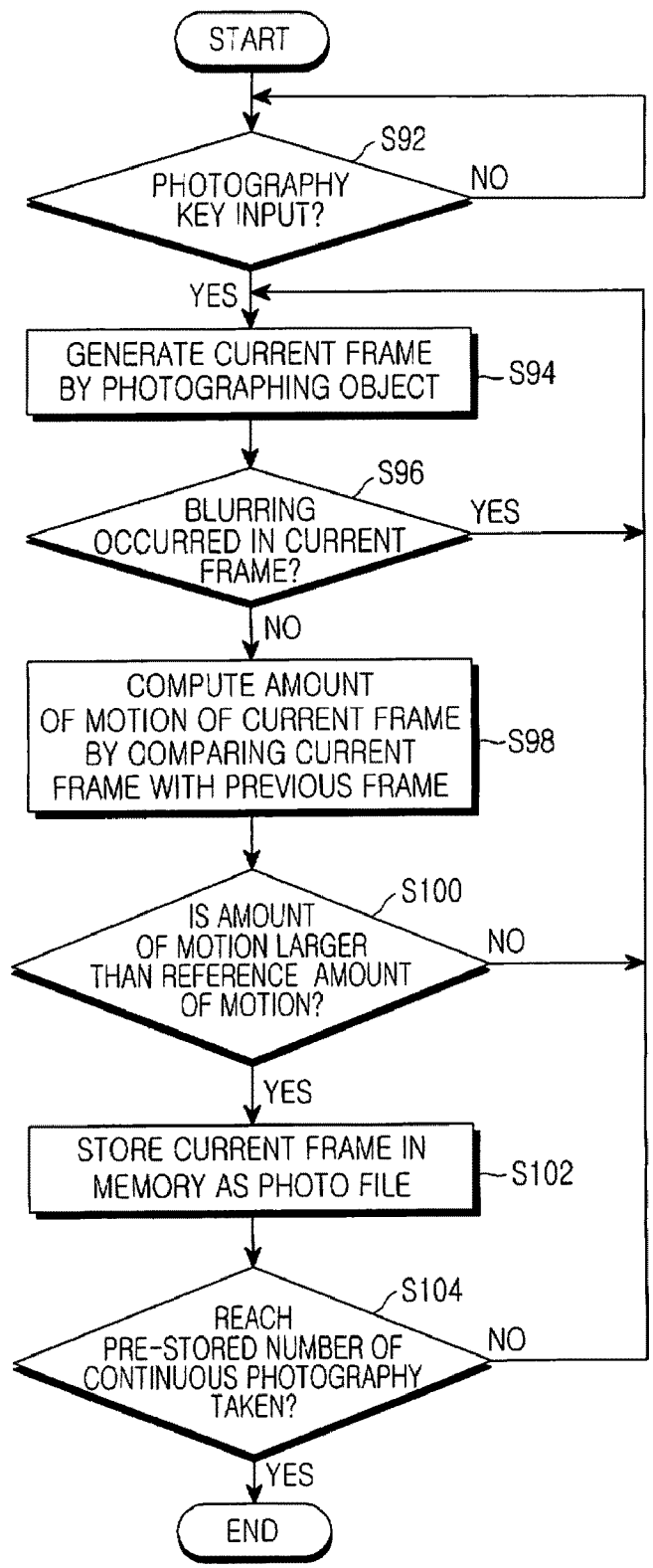
FIG. 4 is a flowchart illustrating a method of taking pictures on a mobile communication terminal having a camera module according to an embodiment of the present invention.

FIG. 4 is a flowchart illustrating a method of taking pictures on a mobile communication terminal having a camera module according to an embodiment of the present invention.

If the camera module operates in a continuous photography mode, the control unit 80 determines whether a photography key is input through the key input unit 54 in step S92. In this case, the continuous photography mode may be set, by user input, through the key input unit 54.

If the photography key is not input through the key input unit 54 ("No" in step S92), the control unit 80 controls the camera module 60 of the mobile communication terminal 50 to maintain the continuous photography mode. If the photography key is input through the key input unit 54 ("Yes" in step S92), the camera module 60 photographs the object and generates the current frame, in step S94. At this time, the control unit 80 may temporarily store the current frame generated by the camera module 60 in the memory 70.

When a current frame is generated in step S94, the control unit 80 determines whether blurring has occurred in the current frame. "Blurring" refers to a phenomenon where the image of an object appears blurred along the motion of the object. The control unit 80 can determine whether blurring has occurred using the edge value calculated by the edge calculation unit 64 of the camera module 60. This feature is described in detail with reference to FIG. 5.

According to an embodiment of the present invention, only clear images in which no blurring has occurred are stored as photo files. Accordingly, if blurring has occurred ("Yes" in step S96), the control unit 80 controls the camera module of the mobile communication terminal 50 to re-photograph the object and to generate the corresponding current frame.

If blurring has not occurred in the current frame ("No" in step S96), the motion measurement unit 66 of the camera module 60 computes the amount of motion of the current frame by comparing the current frame with the previous frame pre-stored in the memory 70, in step S98. The control unit 80 determines whether the amount of motion computed by the motion measurement unit 66 is greater than the reference amount of motion pre-stored in the memory 70, in step S100. The reference amount of motion may be a value pre-stored in the memory 70 by a person skilled in the art in order to measure the degree of motion of an object being photographed in the continuous photography mode.

If the amount of motion is less than or equal to the reference amount of motion stored in the memory ("No" in step S100), the control unit 80 controls the camera module 60 to re-photograph the object and to regenerate the corresponding current frame. At this time, the control unit 80 may delete the current frame of which the amount of motion is less than or equal to the reference amount of motion from the memory 70.

When the amount of motion of the current frame is less than or equal to the reference amount of motion, the difference in motion, state or position between the current frame and the previous frame is very small or there is no difference between the current frame and the previous frame. Since an object of the present invention is to show different motions of a photographed object in respective frames without blurring, frames having a small motion change in comparison to a previous frame are not stored in the memory 70 as a photo file.

If the amount of motion is greater than the reference amount of motion as a result of the determination in step S100 ("Yes" in step S100), the control unit 80 controls the camera module 60 to store the current frame in the memory 70 as a photo file. When the frame is stored as a photo file, temporarily stored digital image data is converted into JPEG form, and the converted data is stored in the memory 70.

Thereafter, the control unit 80 determines whether the number of current frames stored in the continuous photography mode, i.e. the number of photo files, reaches the number of continuous photographs to be taken, which is pre-stored in the memory 70, in step S104. If the number of current frames reaches the number of continuous photographs to be taken ("Yes" in step S104), the control unit 80 terminates the continuous photography mode. However, if the number of current frames is less than the number of continuous photographs to be taken, the control unit 80 re-photographs the object.

"Continuous photography" refers to photographing an object as many as the number of continuous photographs to be taken, which is pre-stored in the memory 70. According to an embodiment of the present invention, the camera module 60 can photograph an object at a pre-stored continuous capture interval, e.g. every 0.5 seconds. However, as is known with reference to steps S96 to S102, since current frames generated in step S94 are not always stored in the memory 70 as photo files, the control unit 80 only recognizes, as instances of photographing, the cases where the current frame is stored in the memory 70 as a photo file.

Figure 5:
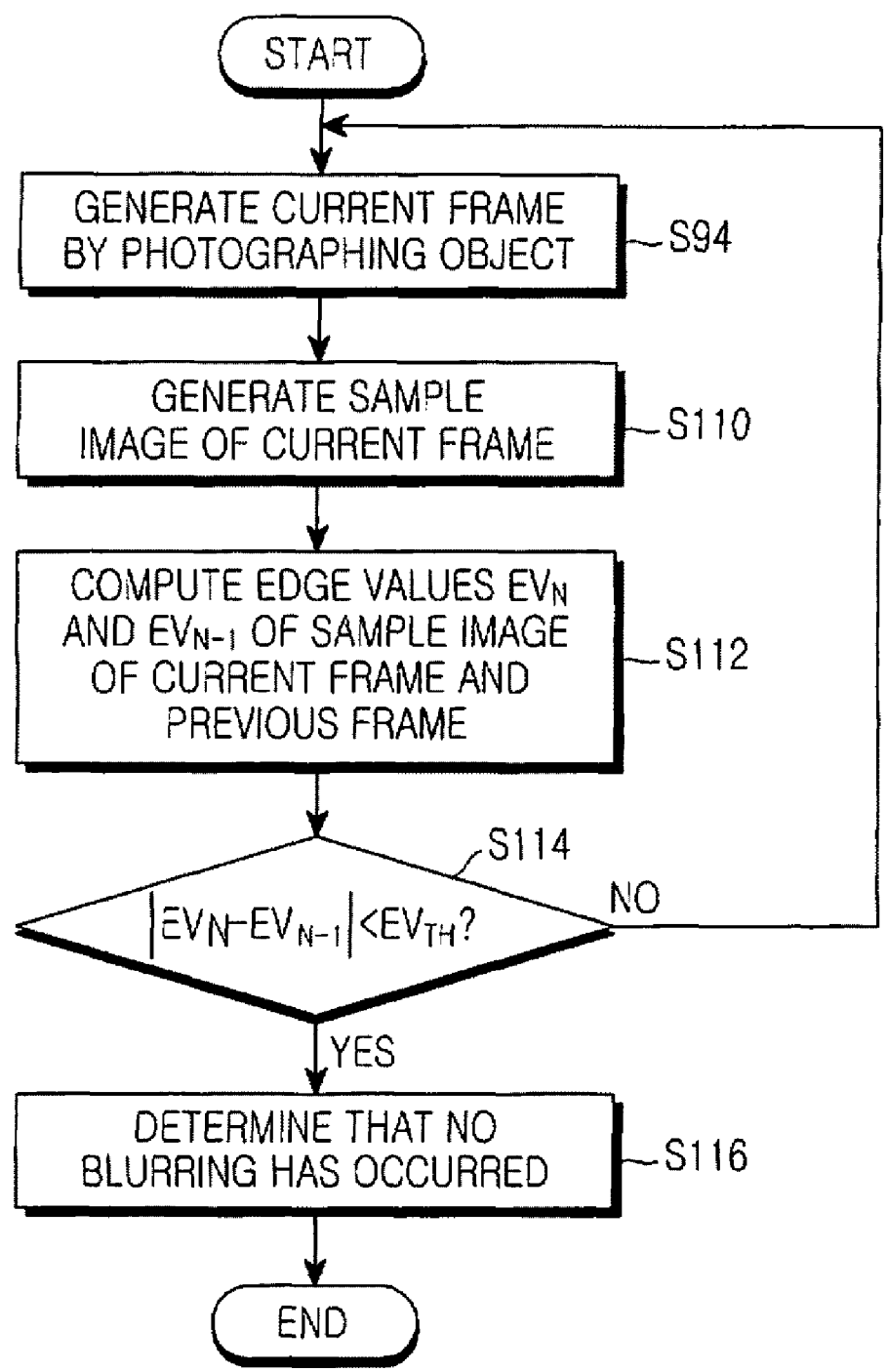
FIG. 5 is a flowchart illustrating in detail a method of determining whether blurring has occurred in the current frame in a mobile communication terminal according to an embodiment of the present invention.

FIG. 5 is a flowchart illustrating, in detail, a method of determining whether blurring has occurred in a current frame in a mobile communication terminal according to an embodiment of the present invention.

In the continuous photography mode, the camera module 60 photographs an object and generates a current frame, in step S94. The image processing unit 62 generates a sample image of the current frame, in step S110.

Under the control of the control unit 80, the image processing unit 62 reduces the current frame generated in step S94 to a pre-determined size, e.g. 640×480 pixels or 320×240 pixels, and stores the reduced current frame in the memory 70. Also, the image processing unit 62 generates the sample image by passing the current frame with a reduced size through the high-pass filter. The current frame having passed through the high-pass filter is as shown in FIG. 7E, in which only the contour of the object appears white and other parts appear black.

In step S112, the control unit 80 computes an edge value $EV_N$ of a sample image of the current frame and an edge value $EV_{N-1}$ of a sample image of the previous frame generated in step S110.

The edge in the current frame indicates a part of an image that presents a great color difference, such as a boundary between an object and a background. Also, according to an embodiment of the present invention, the edge value is a value obtained by numeralizing and adding all edges appearing in the current frame or the previous frame. The edge value may be the number of pixels in a part of the corresponding sample image where edges appear in consideration of the resolution of the sample image.

The control unit 80 obtains the difference between the edge value $EV_N$ of the current frame and the edge value $EV_{N-1}$ of the previous frame, and determines whether the absolute value of the difference $|EV_N-EV_{N-1}|$ is less than the reference edge value $EV_{TH}$ pre-stored in the memory 70, in step S114. The reference edge value $EV_{TH}$ is a value for determining whether blurring has occurred in the current frame, and can be experimentally obtained by a person skilled in the art.

In step S116, if the difference between the edge values of the current frame and the previous frame is less than the reference edge value $EV_{TH}$ ("Yes" in step S114) as a result of the determination in step S114, the control unit 80 determines that no blurring has occurred in the current frame.

In this case, it is assumed that the previous frame is a photo file pre-stored in the memory 70 before the current frame is generated. Accordingly, it is preferable that no blurring has occurred in the previous frame according to an embodiment of the present invention. In the continuous photography mode according to an embodiment of the present invention, since the camera module 60 photographs the same object within a pre-stored time interval, there is substantially no difference between the edge value of the current frame and the edge value of the previous frame.

According to an embodiment of the present invention, the edge value of the previous frame is calculated together with the edge value of the current frame. However, according to another embodiment of the present invention, the previous frame is pre-stored in the memory 70 as a photo file before the current frame is generated, and the sample image of the previous frame or the edge value thereof is also pre-stored in the memory 70.

If the absolute value $|EV_N-EV_{N-1}|$ of the difference between the edge value $EV_N$ of the current frame and the edge value $EV_{N-1}$ of the previous frame is greater than or equal to the reference edge value $EV_{TH}$ ("No" in step S114), the control unit 80 determines that blurring has occurred in the current frame, and controls the camera module 60 of the mobile communication terminal 50 to re-photograph the object and to generate the current frame in step S94.

Figure 6:
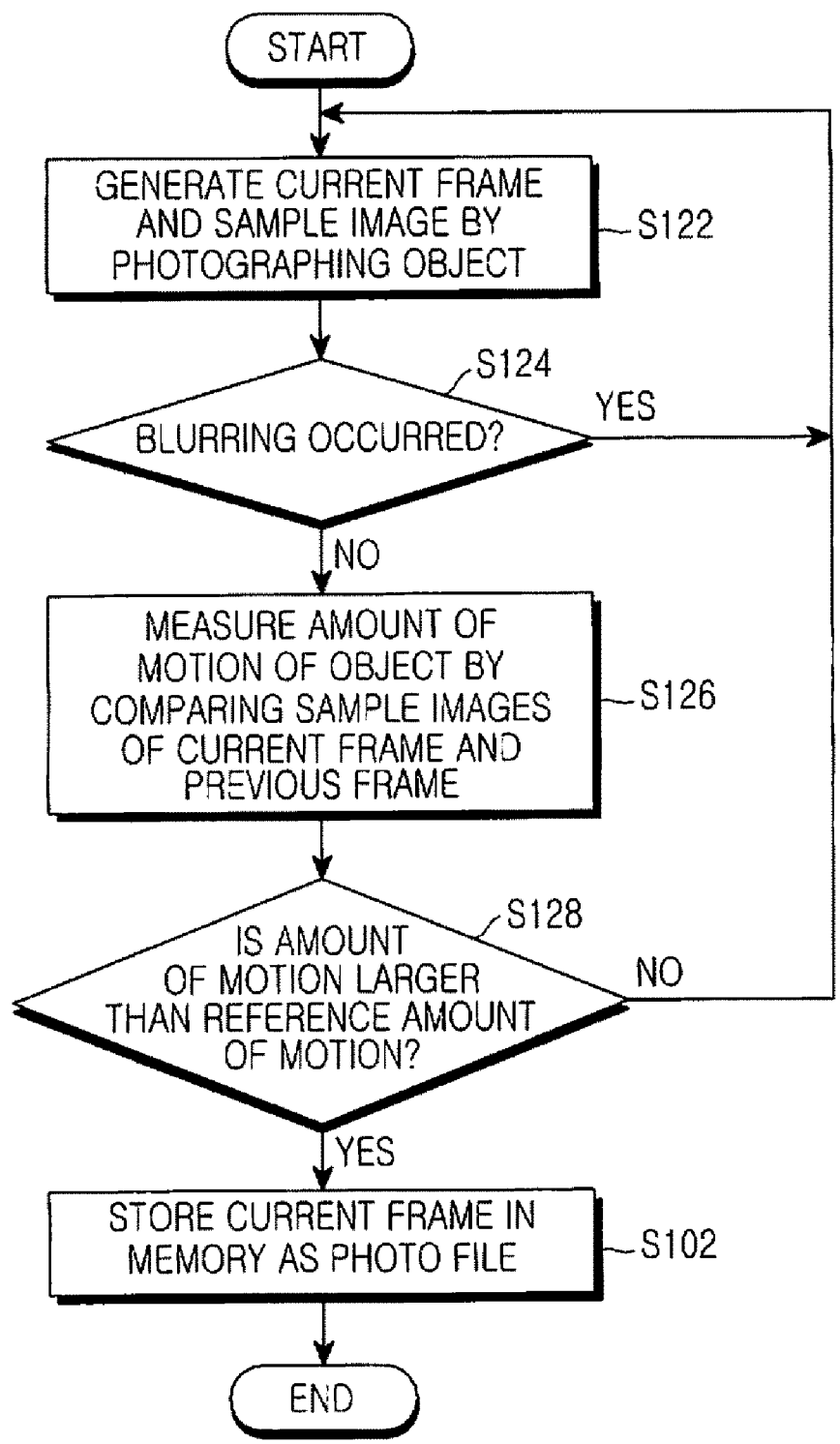
FIG. 6 is a flowchart illustrating a method of determining whether the amount of motion of the current frame is greater than the reference change amount in a mobile communication terminal according to an embodiment of the present invention.

FIG. 6 is a flowchart illustrating a method of determining whether the amount of motion of the current frame is larger than a reference amount of motion in a mobile communication terminal according to an embodiment of the present invention.

In the continuous photography mode, the camera module 60 photographs the object and generates the current frame and a sample image of the current frame in step S122.

The control unit 80 determines whether blurring has occurred in the current frame in step S124, and if blurring has occurred ("Yes" in step S124), the control unit controls the camera module 60 to re-photograph the object in step S122.

If no blurring has occurred in the current frame ("No" in step S124), the motion measurement unit 66 of the camera module 60 measures the amount of motion of the object in the current frame by comparing the sample images of the current frame and the previous frame in step S126. The control unit 80 determines whether the amount of motion of the current frame is larger than the reference amount of motion pre-stored in the memory 70 in step S128.

The amount of motion may be a value indicating how much the object in the current frame has moved in comparison to the object in the previous frame. The amount of motion may be, for example, Red Blue Green (RGB) values of respective pixels included in the previous frame and the current frame. The previous frame and the current frame are obtained by photographing the same object with the same size at the pre-stored continuous capture interval. Accordingly, the same coordinate system can be applied to the previous frame and the current frame. For example, if the RGB value of a pixel positioned at coordinates (5, 15) of the previous frame is "244" and the RGB value in the current frame is "135," it is considered that the RGB value has been changed due to the motion of the object. In the above-described manner, the motion measurement unit 66 counts the number of pixels of which the RGB values have been changed, and if the counted number of pixels exceeds the pre-stored value (i.e. the reference amount of motion), the control unit 80 determines that the motion of the object in the current frame has surely been changed in comparison to the object in the previous frame.

If the amount of motion is less than or equal to the reference amount of motion ("No" in step S128), the control unit 80 controls the camera module 60 to re-photograph the object. If the amount of motion is greater than the reference amount of motion ("Yes" in step S128), the control unit 80 controls the camera module 60 to store the current frame in the memory 70 as a photo file. In this case, the control unit 80 may control the image processing unit 62 to convert the current frame into a JPEG form.

FIGS. 7A to 7E are views illustrating frames photographed by a mobile communication terminal according to an embodiment of the present invention.

Figure 7A:
FIGS. 7A to 7E are illustrations of frames photographed by a mobile communication terminal according to an embodiment of the present invention.
Figure 7B:
Figure 7C:
Figure 7D:
Figure 7E:

FIG. 7A shows a previous frame, and FIG. 7B shows a current frame. FIGS. 7C and 7D show sample images of the previous frame and the current frame before the current frame passes through the high-pass filter. FIG. 7E shows the amounts of motion of the previous frame and the current frame.

According to an embodiment of the present invention, the mobile communication terminal reduces the previous frame and the current frame to the size as illustrated in FIGS. 7C and 7D. The mobile communication terminal generates sample images as shown in FIG. 7E by passing the reduced frames as shown in FIGS. 7C and 7D through the high-pass filter. FIG. 7E shows a synthesized sample image of the previous frame and the current frame.

According to an embodiment of the present invention, when the sample image of the current frame is generated, the control unit 80 passes the current frame through the high-pass filter. It is assumed that in the sample image generated by passing the current frame through the high-pass filter, the edge appears white having an RGB value of "FFFFFF," and the remaining part appears black having an RGB value of "000000." In the embodiment of the present invention, it is assumed that if the RGB value obtained for each pixel of the sample image is "000000," the edge value of the pixel becomes "0," while if the RGB value is "FFFFFF," the edge value of the pixel becomes "1."

In FIG. 7E, the edge of each frame appears white, and other parts of the frame appear black. In the areas of the frame where the motion of the object has not been changed in the previous frame and the current frame, the positions of the edges appearing in the sample images are the same, and thus the edges overlap each other even though the frame are synthesized as shown in FIG. 7E. By contrast, in a part where the motion of the object has been changed, the edges appear differently. In the embodiment of the present invention, if the motion of the object has surely been changed as above, the mobile communication terminal stores the current frame in the memory 70 as a photo file.

As described above, according to the present invention, the mobile communication terminal 50 detects the motion change of the object, and stores the corresponding photo file only when the motion of the object is completed or the object is temporarily stopped. Accordingly, the moving object of which the motion is changed with the lapse of time can be accurately photographed and stored.

Through use of a mobile communication terminal having a camera module according to the present invention, the motion change of the object can be captured and different motions of the object can be easily photographed.

By determining whether blurring has occurred, the photographs taken before the motion of the object is completed are not stored. Accordingly, the user's efforts to remove photo files in which blurring has occurred can be reduced.

Also, by comparing the previous frame with the current frame, the motion change of the object can be clearly detected regardless of the photographic interval, and thus the photo files stored in memory can show different motions of the object. Accordingly, the user can reduce efforts to remove the photo files having similar motion of the object among the photo files taken in the continuous photography mode, and thus the memory having limited capacity can be efficiently used.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of taking pictures on a mobile communication terminal having a camera module, comprising the steps of:
 generating a current frame by photographing an object;
 determining whether blurring has occurred in the current frame;
 if no blurring has occurred in the current frame, measuring the amount of motion of the current frame relative to a pre-stored previous frame by comparing the current frame with the pre-stored previous frame, and determining whether the measured amount of motion is larger than a pre-stored reference amount of motion; and
 if the measured amount of motion is larger than the reference amount of motion, storing the current frame as a photo file, wherein determining whether blurring has occurred in the current frame comprises the steps of:

generating a sample image of the current frame;

computing a first edge value of the sample image;

computing a difference between the first edge value and a second edge value pre-stored for the previous frame, and determining whether the difference value is less than a pre-stored reference edge value; and if the difference value is less than the reference value, determining that no blurring has occurred in the current frame.

2. The method as claimed in claim 1, wherein determining whether blurring has occurred in the current frame further comprises determining that blurring has occurred in the current frame if the difference value is greater than or equal to the reference edge value.

3. The method as claimed in claim 1, wherein measuring the amount of motion of the current frame and determining whether the measured amount of motion is larger than the pre-stored reference amount of motion comprises the steps of:

computing the amount of motion of the object by comparing the sample image of the current frame with a pre-stored sample image of the previous frame; and if the amount of motion is greater than the pre-stored reference amount of motion, determining to store the current frame as the photo file.

4. The method as claimed in claim 3, wherein measuring the amount of motion of the current frame and determining whether the measured amount of motion is greater than the pre-stored reference amount of motion further comprises, if the amount of motion is less than or equal to the pre-stored reference amount of motion, determining not to store the current frame as the photo file.

5. The method as claimed in claim 1, further comprising determining whether a photography key is input from a user in a continuous photography mode before generating the current frame by photographing the object;

wherein if the photograph key is input, the object is photographed as many as a pre-stored number of continuous photographs to be taken.

6. The method as claimed in claim 1, further comprising:

determining whether a number of photo files stored by photographing the object reaches a pre-stored number of continuous photographs to be taken; and if the number of photo files does not reach the pre-stored number continuous photographs to be taken, repeating the photographing of the object until the number of photo files reaches the pre-stored number of continuous photographs to be taken.

7. An apparatus for taking pictures on a mobile communication terminal having a camera module, comprising:

a camera module generating a current frame by photographing an object;

a control unit determining whether blurring has occurred in the current frame by comparing the current frame with a pre-stored previous frame, determining whether the amount of motion of the current frame is larger than a pre-stored reference amount of motion by comparing the current frame with the previous frame if no blurring has occurred in the current frame, and storing the current frame, in which no blurring has occurred and the amount of motion is greater than the reference amount of motion, as a photo file; and a memory for storing the determined current frame as the photo file, wherein the camera module comprises:

an image processing unit generating a first sample image of the current frame and a second sample image of the previous frame; and an edge calculation unit calculating the difference between a first edge value of edges included in the first sample image and a second edge value of edges included in the second sample image;

wherein the control unit determines whether the difference between the first edge value and the second edge value is less than a reference edge value pre-stored in the memory, and if the difference is less than the reference edge value, the control unit determines that no blurring has occurred in the current frame.

8. The system as claimed in claim 7, wherein the control unit determines that the blurring has occurred if the difference between the first edge value and the second edge value is greater than or equal to the reference edge value.

9. The system as claimed in claim 7, wherein the camera module further comprises a motion measurement unit computing the amount of motion of the object by comparing the first sample image with the second sample image;

wherein the control unit determines to store the current frame in the memory as a photo file if the amount of motion is greater than the reference amount of motion.

10. The system as claimed in claim 9, wherein the control unit determines not to store the current frame in the memory as a photo file if the amount of motion is less than or equal to the reference amount of motion.

11. The system as claimed in claim 7, further comprising a key input unit for inputting a photography key from a user;

wherein the control unit determines whether the photography key is input in a continuous photography mode, and if the photograph key is input, the control unit controls the camera module to photograph the object as many as a number of continuous photographs to be taken, which is pre-stored in the memory.

12. The apparatus as claimed in claim 7, wherein the control unit determines whether a number of photo files stored through the photographing of the object reaches a pre-stored number of continuous photographs to be taken, and if the number of photo files does not reach the pre-stored number of continuous photographs to be taken, the control unit repeats the photographing of the object until the number of photo files reaches the pre-stored number of continuous photographs to be taken.

* * * * *